(12) United States Patent
Levy et al.

(10) Patent No.: US 9,740,421 B2
(45) Date of Patent: *Aug. 22, 2017

(54) JUST-IN-TIME REMOTE DATA STORAGE ALLOCATION

(71) Applicant: NetApp, Inc., Sunnyvale, CA (US)

(72) Inventors: Assaf B. Levy, Ramat Hasharon (IL); Vered Rosen, Tel-Aviv (IL); Roee Alon, Kfar-Bilu (IL); Dekel Sharabi, Tel-Aviv (IL); Michael Yakobi, Tel-Aviv (IL)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,819

(22) Filed: Oct. 25, 2016

(65) Prior Publication Data

US 2017/0038992 A1    Feb. 9, 2017

Related U.S. Application Data

(63) Continuation of application No. 14/594,828, filed on Jan. 12, 2015, now Pat. No. 9,507,526.

(60) Provisional application No. 62/079,989, filed on Nov. 14, 2014.

(51) Int. Cl.
*G06F 3/06* (2006.01)
*H04L 29/08* (2006.01)

(52) U.S. Cl.
CPC ............ *G06F 3/0631* (2013.01); *G06F 3/061* (2013.01); *G06F 3/0604* (2013.01); *G06F 3/0605* (2013.01); *G06F 3/067* (2013.01); *G06F 3/0644* (2013.01); *G06F 3/0653* (2013.01); *G06F 3/0659* (2013.01); *G06F 3/0679* (2013.01); *H04L 67/1097* (2013.01); *H04L 67/30* (2013.01)

(58) Field of Classification Search
CPC .... G06F 3/0631; G06F 3/0604; G06F 3/0605; G06F 3/0659; G06F 3/061; G06F 3/0644; G06F 3/0653; G06F 3/067; G06F 3/0679
USPC ............................ 711/158, 4, 111, 112, 170
See application file for complete search history.

(56) References Cited

U.S. PATENT DOCUMENTS

| 7,055,014 | B1 * | 5/2006 | Pawlowski | ........... G06F 3/0605 |
| | | | | 707/E17.01 |
| 7,577,692 | B1 * | 8/2009 | Corbett | ............. G06F 17/30067 |
| 7,636,744 | B1 * | 12/2009 | Aggarwal | ......... G06F 17/30067 |
| 7,949,847 | B2 | 5/2011 | Murase | |
| 8,260,831 | B2 * | 9/2012 | Tyrrell | .............. G06F 17/30067 |
| | | | | 707/823 |
| 8,266,191 | B1 * | 9/2012 | Aggarwal | ......... G06F 17/30067 |
| | | | | 707/820 |

(Continued)

*Primary Examiner* — Stephen Elmore
(74) *Attorney, Agent, or Firm* — Gilliam IP PLLC

(57) ABSTRACT

A just-in-time storage allocation is initiated for storage at a remote storage device having flash storage. Each of multiple containers comprises a grouping of one or more of the flash storage. The just-in-time storage allocation includes an application profile that includes a priority criteria for the storage of either a priority of performance over efficiency or a priority of efficiency over performance. A determination is made of whether at least one container of the multiple containers satisfies the priority criteria based on at least one attribute of the at least one container. The storage is allocated in the at least one container, in response to the at least one container satisfying the priority criteria.

20 Claims, 5 Drawing Sheets

(56) References Cited

U.S. PATENT DOCUMENTS

| | | |
|---|---|---|
| 8,281,096 B1 | 10/2012 | Ranade |
| 8,332,860 B1 | 12/2012 | Yahalom et al. |
| 8,549,223 B1 | 10/2013 | Kaliannan et al. |
| 8,572,338 B1 | 10/2013 | Marathe et al. |
| 8,578,087 B2 | 11/2013 | Acedo et al. |
| 8,646,050 B2 | 2/2014 | Vidrine et al. |
| 8,874,822 B2 | 10/2014 | Totolos, Jr. et al. |
| 8,881,144 B1 | 11/2014 | Banerjee et al. |
| 8,898,480 B2 | 11/2014 | Lamacchia et al. |
| 9,177,177 B1 | 11/2015 | Patil et al. |
| 9,230,091 B2 | 1/2016 | Lamacchia et al. |
| 9,383,924 B1 | 7/2016 | Fullbright et al. |
| 9,424,019 B2 | 8/2016 | Nightingale et al. |
| 2004/0230317 A1* | 11/2004 | Kumar .................. G06F 3/0605 700/1 |
| 2007/0150690 A1 | 6/2007 | Chen et al. |
| 2008/0126734 A1 | 5/2008 | Murase |
| 2008/0229048 A1 | 9/2008 | Murase et al. |
| 2010/0174864 A1 | 7/2010 | Bar-El et al. |
| 2011/0191563 A1 | 8/2011 | Acedo et al. |
| 2011/0208931 A1 | 8/2011 | Pendharkar et al. |
| 2012/0084492 A1 | 4/2012 | Stenfort |
| 2012/0185700 A1 | 7/2012 | Vidrine et al. |
| 2013/0346979 A1 | 12/2013 | Nightingale et al. |
| 2015/0052518 A1 | 2/2015 | Sarisky et al. |
| 2015/0317407 A1* | 11/2015 | Jernigan, IV ..... G06F 17/30115 707/812 |
| 2016/0077745 A1* | 3/2016 | Patel .................... G06F 3/0608 714/704 |

\* cited by examiner

JUST-IN-TIME REMOTE DATA STORAGE ALLOCATION

RELATED APPLICATIONS

This application is a continuation of and claims priority benefit of U.S. patent application Ser. No. 14/594,828 (now issued as U.S. Pat. No. 9,507,526) filed Jan. 12, 2015, which claims the priority benefit of U.S. Provisional Application No. 62/079,989 filed Nov. 14, 2014.

BACKGROUND

This disclosure generally relates to the field of remote data storage, and, more particularly, to just-in-time remote data storage allocation.

Various large enterprises (e.g., businesses) may need to store large amounts of data (e.g., financial records, human resource information, research and development data, etc.). The amount of storage needed typically grows over time. In conventional data storage approaches, these large enterprises can purchase physical disks at some local or remote site. For example, the enterprises (e.g., a business) can purchase a shelf of physical storage disks at some customer data center. Volumes can be defined on these physical storage disks. The enterprises' applications can then access these volumes over a network for writing, reading, etc. data thereon. For this approach, the number of physical storage disks is limited. Therefore, to ensure that storage is available, the physical storage disks are typically under provisioned just in case additional storage is needed. However, this under provisioning of the physical storage disks can result in the purchase of physical storage disks that is not needed or unused for a long period of time.

BRIEF DESCRIPTION OF THE DRAWINGS

The embodiments may be better understood to those skilled in the art by referencing the accompanying drawings.

DESCRIPTION OF EXAMPLE ILLUSTRATIONS

Figure 1:
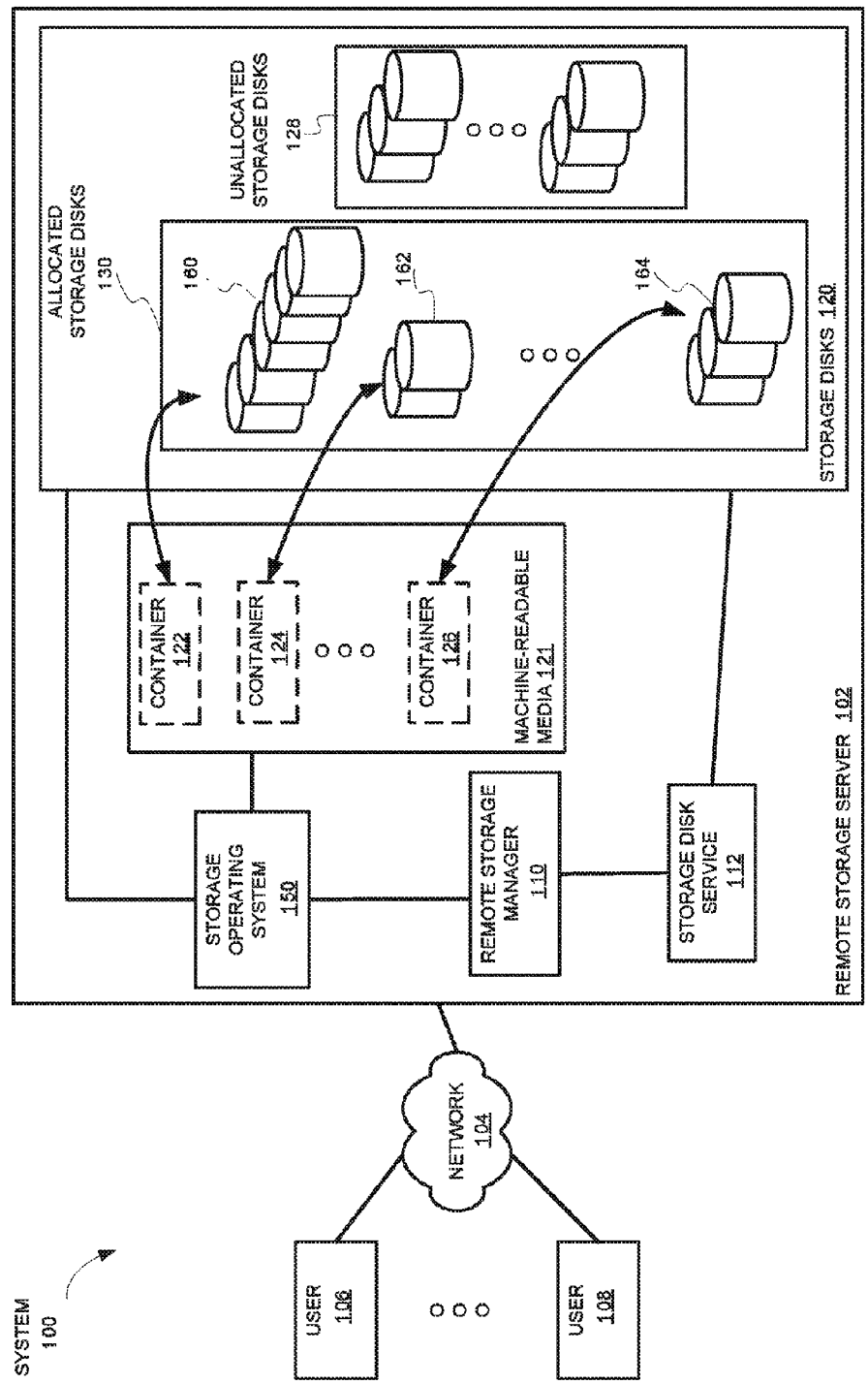
FIG. 1 depicts a system that includes remote storage that provides just-in-time storage allocation, according to some features.

The description that follows includes example systems, methods, techniques, instruction sequences and computer program products that includes techniques of the features described herein. For instance, this disclosure often refers to storage disks for ease of understanding. Embodiments can be applied to any type of storage and is not limited to storage disks. Examples of other storage that can be allocated in accordance with this disclosure include flash storage, disk arrays, flash arrays, tape drives, tape arrays, etc. In addition, examples refer to a storage server that stores data. But embodiments are not so limited. Embodiments can be applied to environments that employ a network storage architecture (e.g., network attached storage, storage area network, etc.). Further, examples herein refer to volumes. Embodiments are not limited to volumes and can be applied to various logical storage containers regardless of the moniker. However, it is understood that the described features may be practiced without these specific details. In instances, well-known instruction instances, protocols, structures and techniques have not been shown in detail in order not to obfuscate the description.

Overview

Remote data storage can include cloud storage in which storage space is allocated from storage devices maintained and provided by a service provider (e.g., cloud service provider). In addition to the storage devices, the service provider can maintain storage controllers and storage network elements (e.g., switches, bridges, etc.). The service provider provides access to its resources (e.g., the storage space) via interfaces (e.g., application programming interfaces) that communicate with the appropriate elements of the service provider (e.g., gateways, servers, etc.) to request allocations and access allocated storage space.

Storage space in a remote data storage of a service provider can be organized and allocated by "containers." Examples of a container include an aggregate (i.e., a grouping of storage arrays), a volume, a partition, etc. A container can include multiple storage devices or can include portions of space of multiple storage devices (i.e., multiple storage devices can support multiple containers). In response to determining more storage is needed for a user, new storage space can be allocated within a current container or a new container. In particular, a determination is made of whether 1) a current container has sufficient capacity to accommodate this new allocation without allocating additional storage disks to the current container, 2) a current container has sufficient capacity to accommodate this new allocation based on allocating additional storage disks to the current container, or 3) a new container having one or more storage disks needs to be created to accommodate this new allocation. This allocation to a specific container can be made independent of user involvement. Accordingly, in response to a user needing more storage capacity, the remote data storage can be configured to provide more storage allocation in a specific container without the user's involvement or knowledge. As further described below, the container can be selected based on the application profile and the current available containers.

Example System

FIG. 1 depicts a system that includes remote storage that provides just-in-time storage allocation. FIG. 1 depicts a system 100 that includes a remote storage server 102. For example, the remote storage server 102 can be a cloud-based server in which users can be allocated storage at a remote location that is accessible over a network. The system 100 also includes a number of users (shown as a user 106 and a user 108). The users 106-108 can represent applications of different enterprises or individual users that are communicatively coupled to the remote storage server 102 through a network 104. The users 106-108 can access (e.g., read or write) data that is stored at the remote storage server 102 through the network 104.

The remote storage server 102 includes storage disks 120, an operating system 150, a remote storage manager 110, a storage disk service 112, and machine-readable media 121. The storage disks 120 includes allocated storage disks 130 and unallocated storage disks 128. The allocated storage disks 130 include storage disks 160, storage disks 162, and storage disks 164. As further described below, the allocated storage disks 130 include those storage disks that have already been allocated or provisioned to at least one of the users 106-108. For example, volumes can be created on the allocated storage disks 130 such that a user can read and write data on those volumes assigned to the user. The storage disks can be allocated to a user based on just-in-time storage allocation in which a user can be allocated more storage as more is needed (on an as-need basis).

Figure 5:
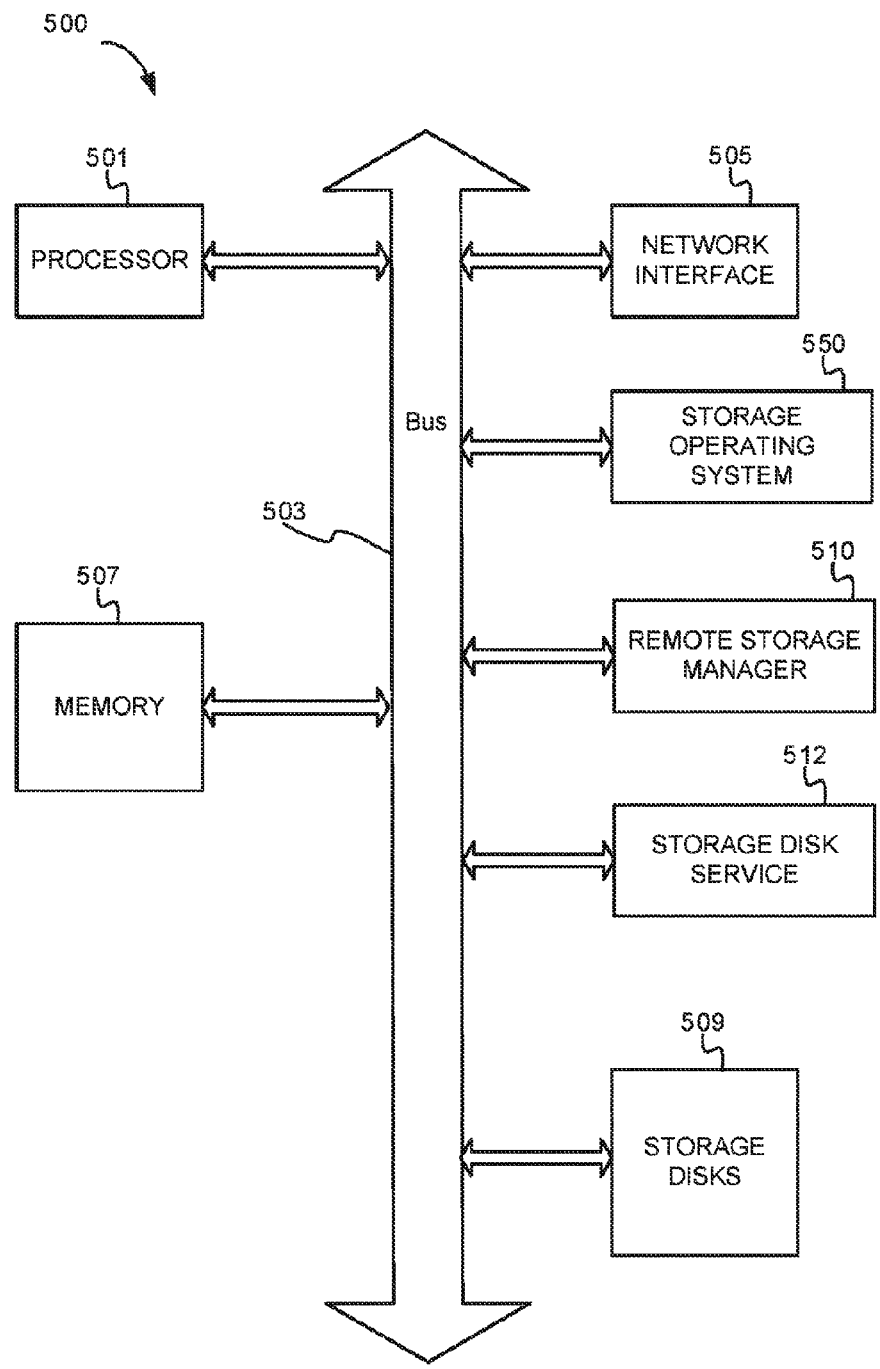
FIG. 5 depicts an example architecture of a remote storage server, according to some features.

The remote storage manager 110 is communicatively coupled to the operating system 150 and the storage disk service 112. The storage disk service 112 and the storage operating system 150 are communicatively coupled to the storage disks 120. The storage operating system 150 is communicatively coupled to the machine readable media 121. The storage operating system 150, the remote storage manager 110, and the storage disk service 112 can be software, firmware, hardware or a combination thereof. For example, the storage operating system 150, the remote storage manager 110, and the storage disk service 112 can be software executing on a processor (not shown in FIG. 1). An example of this architecture is depicted in FIG. 5, which is described in more detail below. The machine-readable media 121 can be different types of volatile or nonvolatile memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.). The machine-readable media 121 is configured to store a number of containers (shown as a container 122, a container 124, and a container 126). A container can represent a logical grouping of one or more storage disks. The operating system 150 can manage the containers. The operating system 150 can create, delete, expand or reduce the containers. For example, the operating system 150 can expand a container to add more storage disks to its logical grouping. FIG. 1 also depicts the relationships between the containers stored in the machine-readable media 121 and the allocated storage disks 130 stored in the storage disks 120. The container 122 includes a logical grouping of storage disks 160 (six storage disks). The container 124 includes a logical grouping of storage disks 162 (two storage disks). The container 126 includes a logical grouping of storage disks 164 (three storage disks). The storage disk service 112 can provide information about the storage disks 120 to the remote storage manager. For example, the storage disk service 112 can provide different information about the storage disks 120 in the remote storage server 102 (e.g., performance characteristics, size, type, number, etc. of the storage disks 120).

As further described below, in response to determining more storage is needed for a user, storage operating system 150 can allocate storage within a current or new container. In particular, a determination is made of whether 1) a current container has sufficient capacity to accommodate this new allocation without adding additional storage disks to the current container, 2) a current container has sufficient capacity to accommodate this new allocation based on adding additional storage disks to the current container, or 3) a new container having one or more storage disks needs to be created to accommodate this new allocation.

Although FIG. 1 depicts the remote storage server 102 as including storage disks 120, the scope of the claims are not so limited. Just-in-time allocation of storage space from a service provider can be applied if the remote storage server 102 is communicatively coupled with storage disks 120. The remote storage server 102 can be coupled with the storage disks 120 with any of various networking implementations (e.g., switched fabric, Ethernet, iSCSI, etc.). The remote storage server 102 may cache data for the storage disks 120 and/or maintain metadata about the data stored on the storage disks 120. As stated previously, the storage disks 120 can be flash storage, tape drives, etc.

Example Just-In-Time Storage Allocation Operations

Figure 2:
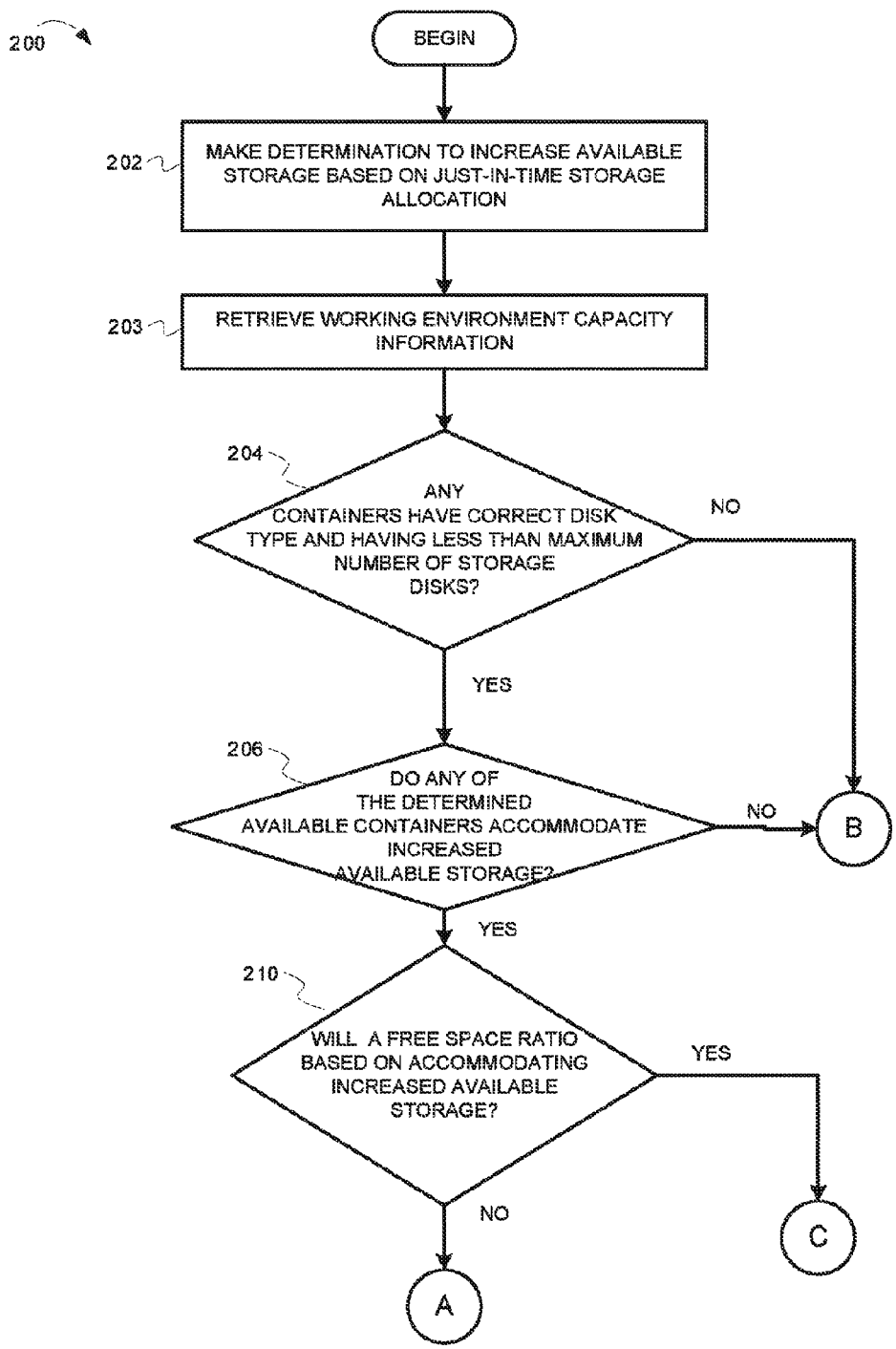
FIGS. 2-4 depict flowcharts of operations for selection of a current or new container for additional storage based on a just-in-time storage allocation, according to some features.
Figure 3:
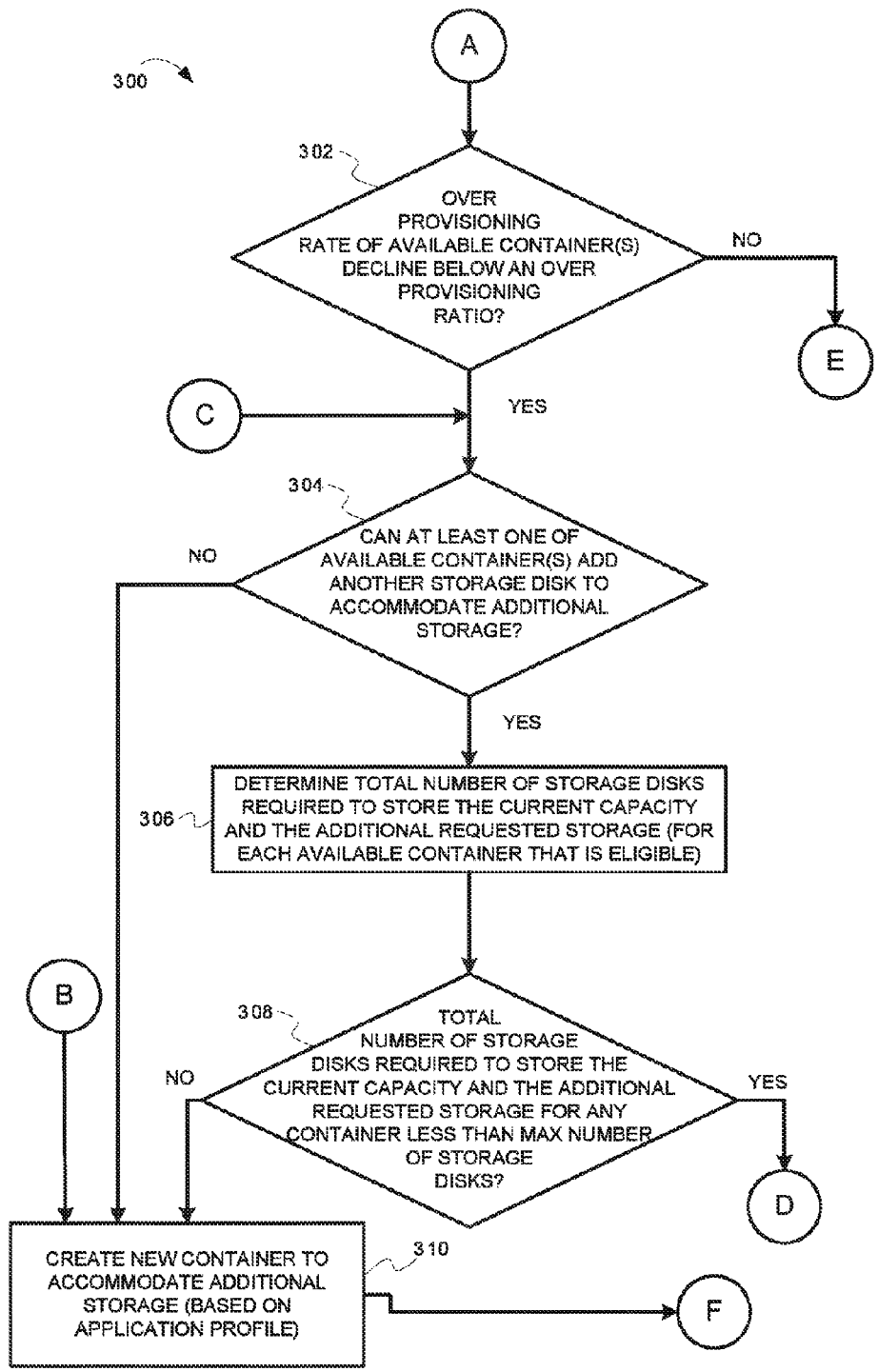
Figure 4:
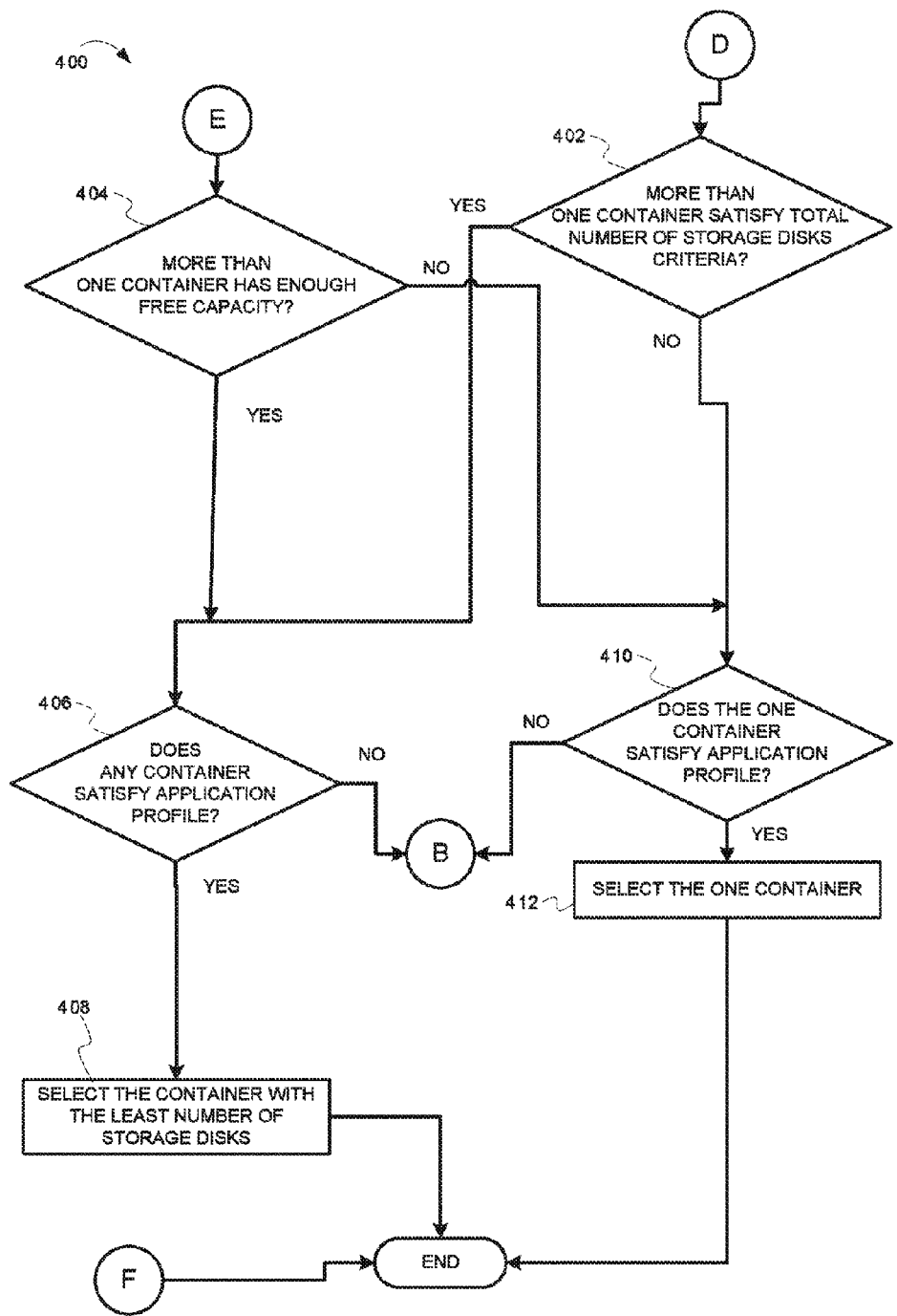

Various operations that can be performed for just-in-time storage allocation at a remote storage server in response to additional storage being needed are now described. In particular, FIGS. 2-4 depict flowcharts of operations for just-in-time storage allocation at a remote storage server. The operations depicted in FIGS. 2-4 are described in reference to a user making a request for additional storage. However, these operations can also occur based on monitoring storage usage, for instance by different user applications. For example, a remote storage manager can initiate a request for additional storage for an application if the application is almost out of space based on its current storage capacity (without any user request). As an example, the request for additional storage can be initiated if the free space remaining for an application is less than some threshold (e.g., 5%).

A flowchart 200 of FIG. 2, a flowchart 300 of FIG. 3, and a flowchart 400 of FIG. 4 are described in reference to FIG. 1. The operations of the flowcharts 200-400 are performed together and continue among each other as defined by transition points A, B, C, D, and E. The operations of the flowcharts 200-400 can be performed by software, firmware, hardware or a combination thereof. With reference to the example of FIG. 1, the operations can be performed by the remote storage manager 110 and the storage operating system 150. The operations of the flowchart 200 start at block 202.

At block 202, a determination is made to increase available storage based on a just-in-time storage allocation. For example, the remote storage manager 110 can determine that the user 106 is in need of additional storage space. The remote storage manager 110 can make this determination based on a request from the user 106 for additional storage. For example, the request from the user 106 can include the name of the volume, the size of the volume (e.g., 200 Gigabytes, 1 Terabyte, etc.) and the underlying storage disk type. The underlying storage disk type can be based on one or more performance characteristics (e.g., the number of Provisioned Input/Output per Second (PIOPS). For example, a performance characteristic of the underlying storage disk type can be 300 PIOPS, 1000 PIOPS, 2000 PIOPS, 3000 PIOPS, 4000 PIOPS, etc. The remote storage manager 110 can also make this determination based on monitoring usage by the user 106. For example, the remote storage manager 110 can make a determination that the current available storage for the user 106 has dropped below an available storage threshold (e.g., 10%), thereby triggering the need for additional storage for the user 106. Operations of the flowchart 200 continue at block 203.

At block 203, the working environment capacity information is retrieved. With reference to FIG. 1, the remote storage manager 110 can request the working environment capacity information from the storage operating system. The working environment capacity information can include an identification associated with this group of containers (the containers 122-126). The working environment capacity information can also include the following information about each container in this working environment: 1) name, 2) total size, 3) used size, 4) number of storage disks, 5) number of volumes, 6) storage disk type, and 7) the over provisioning amount. The over provisioning amount for a container includes the total of all the container's thin provisioned volume size−used size:

$$\Sigma_{Container's\ thin\ provisioned\ volumes}(\text{volumeSize}-\text{volumeUsedSize})$$

Thin provisioning can include a virtualization of the storage space in the containers such that more space is presented as allocated than is actually allocated. In other words, if a storage configuration has enough physical resources to simultaneously support all of the virtualized resources, the storage configuration cannot be defined as thin provisioned. Operations of the flowchart 200 continue at block 204.

At block 204, a determination is made of whether there are any containers having the correct storage disk type and having less than the maximum number of storage disks. With reference to FIG. 1, the remote storage manager 110 can make this determination. According to some aspects, each storage disk in a container is of a same storage disk type. Therefore, if the user has configured their storage to have a certain storage disk type, the remote storage manager 110 locates those available containers having this requested storage disk type. Also, the working environment capacity information includes the number of storage disks in each container. In the example depicted in FIG. 1, the container 122 includes six storage disks (the storage disks 160); the container 124 includes two storage disks (the storage disks 162); and the container 126 includes three storage disks (the storage disks 164). For those containers having the correct storage disk type, the remote storage manager 110 also determines whether these containers have less than the maximum number of storage disks (e.g., five). The "maximum" number of storage devices can depend on various factors (e.g., platform, configuration, etc.). A container can have different storage disk types. In these situations, there is no criterion for having a correct storage disk type. Therefore, the remote storage manager 110 can locate those containers having less than the maximum number of storage disks (independent of the storage disk type). If there are no containers having the correct storage disk type and having less than the maximum number of storage disks (referred to herein as "determined available containers"), operations of the flowchart 200 continue at block 310. Otherwise, operations of the flowchart 200 continue at block 206.

At block 206, a determination is made of whether any of the determined available containers can accommodate the increased available storage. With reference to FIG. 1, the remote storage manager 110 can make this determination. In particular, when more storage is needed for a user, the remote storage manager 110 can search the determined available containers to determine whether an existing container can accommodate the additional storage (e.g., added volume) or whether a new container needs to be created. If none of the determined available containers can accommodate the increased storage, operations of the flowchart 200 continue at transition point B, which continues at transition point B in the flowchart 300 of FIG. 3. Otherwise, operations of the flowchart 200 continue at block 210.

At block 210, a determination is made of whether free space in the available container(s) decline below a free space ratio based on accommodating the increased storage. With reference to FIG. 1, the remote storage manager 110 can make this determination. For example, the remote storage manager 110 can determine that the available container is considered to have enough free space if the following is true:

$$\frac{\text{container used size}}{\text{container size}} < 1 - \text{free space ratio}$$

The "container used size" is the amount of storage in the container that is currently being used to store data. The "container size" is the amount of storage (both used and unused) that is available to store data, or the configured size of the container. The "free space ratio" is the amount of free space that is to remain available in the container. In a first example, assume the "free space ratio" is 0.1 (10%), the "container size" is 100 gigabytes and the "container used size" is 95 gigabytes. In this first example, this available container would fail the free space test because the ratio 0.95>1-0.1. In a second example, assume the "free space ratio" is 0.1 (10%), the "container size" is 100 gigabytes and the "container used size" is 88 gigabytes. In this second example, this available container would pass the free space test because the ratio 0.88<0.90. According to some aspects, the additional storage is thin provisioned. According to some other aspects, the additional storage is not thin provisioned. If the additional storage is not thin provisioned, the "container used size" can include the amount of storage in the container that is currently being used to store data plus the amount of storage being requested to be added. In contrast, if the additional storage is thin provisioned, the "container used size" does not include the amount of storage being requested to be added. If the free space in the available container(s) does not decline below the free space ratio, operations of the flowchart 200 continue at transition point A, which continues at transition point A in the flowchart 300. If the free space in the available container(s) does decline below the free space ratio, operations of the flowchart 200 continue at transition point C, which continues at transition point C in the flowchart 300.

The operations of the flowchart 300 are now described. The flowchart 300 begins at the transition point A (that is a continuation from transition point A of the flowchart 200). From the transition point A, operations of the flowchart 300 continue at block 302.

At block 302, a determination is made of whether the over provisioning rate of the available container(s) (that have passed the free capacity test described in block 210 above) has declined below an over provisioning ratio. With reference to FIG. 1, the remote storage manager 110 can make this determination. For example, the remote storage manager 110 can determine that the available container's over provisioning rate has not declined below the over provisioning ratio if the following is true:

$$\frac{\sum_{\substack{\text{Container's} \\ \text{thin provisioned} \\ \text{volumes}}} (volumeSize - volumeUsedSize)}{ContainerFreeSize} < OPRatio$$

The "container free size" is the amount of free storage space in the container. The "volume size" is the size of a volume in the container. The "volume used size" is the amount of space in a volume that has been used. The "volume size"–the "volume used size" can be summed across all of the thin provisioned volumes in the container. The "OPRatio" is the over provisioning ratio that the container's provisioning rate is not to fall below. For example, assume that the over provisioning ratio is five and that the "container free size" is 10 Gigabytes. Also, assume that the container includes 10 volumes, wherein each volume has a "volume size" of 11 Gigabytes and a "volume used size" of one Gigabyte. For this example, the result would be as follows:

$$\frac{\sum_{10}(11GB-1GB)}{10 \text{ Gigabytes}} > 5 \text{ or } 100/10 > 5$$

In this example, the container is over provisioned because the over provisioning rate of the available container is greater than an over provisioning ratio.

If the requested additional storage is not provisioned, the "volume size" of the additional storage can be included in the summarization across all of the thin provisioned volumes in the container, wherein the "volume used size" of 0–(volumeSize of additional storage–0). If the requested additional storage is not thin provisioned, the "volume size" of the requested additional storage is not included in the summarization across all of the thin provisioned volumes in the container. If the over provisioning rate of the available container(s) has not declined below an over provisioning ratio, operations of the flowchart 300 continue at block 304. Otherwise, operations of the flowchart 300 continue at transition point E, which continues at transition point E in the flowchart 400 of FIG. 4. Also, from the transition point C, operations of the flowchart 300 continue at block 304.

At block 304, a determination is made of whether at least one of the available container(s) can add another storage disk to accommodate additional storage. With reference to FIG. 1, the remote storage manager 110 can make this determination. In particular, the remote storage manager 110 can determine whether any of the containers that have enough free space (see block 210) and whose capacity is not over provisioned (see block 302) can add another storage disk to accommodate the requested additional storage. The remote storage manager 110 can make this determination. If at least one of these available container(s) can add another storage disk to accommodate additional storage, these available container(s) can be considered eligible containers and operations of the flowchart 300 continue at block 306. Otherwise, operations of the flowchart 300 continue at block 310.

At block 306, the total number of storage disks required to store the current capacity and the additional requested storage (for each available container that is eligible) is determined. With reference to FIG. 1, the remote storage manager 110 can make this determination. As described above, a container may have a maximum number of storage disks that can be used to store user data. The maximum number of storage disks can vary or be constant across the different containers. The remote storage manager 110 can determine this data for each available container that is eligible. Operations of the flowchart continue at block 308.

At block 308, a determination is made of whether the total number of storage disks to store the current capacity and the additional requested storage for any eligible available container is less than the maximum number of storage disks (whether the total number of storage disks criteria is satisfied—also used in block 402 described below)). With reference to FIG. 1, the remote storage manager 110 can make this determination. The remote storage manager 110 can determine the maximum number of storage disks for each eligible available container. The remote storage manager 110 can determine that none, one, or more than one eligible available container satisfy this storage criteria. If none of the eligible available containers satisfy this storage criteria (total number of storage disks can store the current capacity and the additional requested storage), operations of the flowchart 300 continue at block 310. Otherwise, operations of the flowchart continue at transition point D, which continues at transition point D of the flowchart 400 (further described below). Also, from the transition point B, operations of the flowchart 300 continue at block 310.

At block 310, a new container is created to accommodate additional storage (based on the application profile). With reference to FIG. 1, the remote storage manager 110 can request that the storage operating system 150 create the new container. The number of storage disks that are needed to provide the requested capacity for the requested storage can be based on the following:

$$numberOfDisksToAdd = ceil\left(\frac{requestedCapacity}{StorageDeviceCapacity}\right)$$

Also, the application profile can be part of the request for storage. The application profile can be provided by the user that is requesting the storage. The application profile can define the performance and efficiency of the storage being requested. For example, as part of the request for storage, the user can request a certain size for the storage volume (e.g., 100 Gigabytes) having one of a number of application profiles. A first type of application profile can be performance-based, wherein performance has priority over cost. For example, the storage that is to be allocated is not based on thin provisioning, compression, or other types of efficiencies that may adversely affect I/O performance. Therefore, if the request is for 100 Gigabytes of storage, the container needs to actually have 100 Gigabytes. A second type of application profile is efficiency-based. For example, thin provisioning can be used on the allocation of storage for this request. A third type of application profile is a compromise between performance and efficiency with a bias toward one or the other. For example, the third type of application profile can have a performance bias having some efficiency. The type of application profile can also determine the type of underlying storage disk type to be used. For example, for a performance-based application profile, a performance characteristic of the storage disk type is a highest available PIOPS (e.g., 4000 PIOPS). In contrast, for an efficiency-based application profile, a performance characteristic of the storage disk type is a lowest available PIOPS (e.g., 300 PIOPS). For a performance bias with efficiency-based application profile, the storage disk type is a mid-range available PIOPS (e.g., 1000-2000 PIOPS).

Also according to some aspects, the storage can be a Redundant Array of Independent Disks (RAID) that includes data striping. The data striping provides for storage of data by segmenting logically sequential data such that consecutive segments are stored on different storage disks. Thus, the more storage disks that are used, the better the performance (faster I/O operations). Accordingly, the more storage disks that a container includes, the better the performance of the container. Therefore, the remote storage manager 110 can create a container with more storage disks if the application profile is performance-based. Alternatively, the remote storage manager 110 can create a container with less storage disks if the application profile is efficiency-based. Additionally, the capacity of the storage disk used for the container can be based on the application profile. In particular, the greater the capacity of the storage disk, the better the performance but greater cost. Therefore, the remote storage manager 110 can create a container with greater capacity storage disks (e.g., 6 Terabytes) if the application profile is performance-based. Alternatively, the remote storage manager 110 can create a container with less capacity storage disks (e.g., 1 Terabyte) if the application is efficiency-based. Therefore, the remote storage manager 110 can request that the storage operating system 150 create the new container with one or more storage disks with different criteria based on the application profile. Operations of the flowchart 300 continue at transition point F, which continue at transition point F in the flowchart 400 of FIG. 4, which completes the operations.

The operations of the flowchart 400 are now described. The flowchart 400 begins at either the transition point D (that is a continuation from transition point D of the flowchart 300) or the transition point E (that is a continuation from transition point E of the flowchart 300). From the transition point D, operations of the flowchart 400 continue at block 402. From the transition point E, operations of the flowchart 400 continue at block 404.

At block 402, a determination is made of whether more than one container satisfies the total number of storage disks criteria. In other words, a determination is made of whether more than one eligible available container satisfies the following—the total number of storage disks in the container to store the current capacity and the additional requested storage is less than the maximum number of storage disks) (see block 308 described above). With reference to FIG. 1, the remote storage manager 110 can make this determination. If more than one container satisfies the total number of storage disks criteria, operations of the flowchart 400 continue at block 404. If only one container satisfies the total number of storage disks criteria, operations continue at block 406.

At block 404, a determination is made of whether more than one container has enough free capacity. In other words, a determination is made of whether free space in more than one available container has not declined below a free space ratio based on accommodating increased storage (see block 210 described above) and whether over provisioning rate of the more than one available container has not declined below an over provisioning ratio (see block 302 described above)). With reference to FIG. 1, the remote storage manager 110 can make this determination. If more than one container has enough free capacity, operations of the flowchart 400 continue at block 404. If only one container has enough free capacity, operations continue at block 406.

At block 406, a determination is made of whether any of the multiple containers satisfy the application profile. With reference to FIG. 1, the remote storage manager 110 can make this determination. For example, if the operations are coming from block 402, the remote storage manager 110 can determine whether any of the multiple containers that satisfy the total number of storage disks criteria also satisfy the application profile. If the operations are coming from block 404, the remote storage manager 110 can determine whether any of the multiple containers that have enough free capacity satisfy the application profile. As described above, there can be different types of application profiles having different criteria. For example, the criteria for the application profiles can include the storage disk type, the number of storage disks in the container, capacity of the storage disks, thin provisioning, compression, etc. If any container satisfies the application profile, operations of the flowchart 400 continue at block 408. Otherwise, operations of the flowchart 400 continue at transition point B, which continues at transition point B in the flowchart 300, in which a new container is created (as described above at block 310).

At block 408, the container with the least number of storage disks is selected. With reference to FIG. 1, the remote storage manager 110 can make this selection. In particular, because there are multiple containers that can be selected, the remote storage manager 110 can select the container with the least number of storage disks. For this path in the flowchart 400, the operations are complete.

At block 410, a determination is made of whether the one container satisfies the application profile. With reference to FIG. 1, the remote storage manager 110 can make this determination. For example, if the operations are coming from block 402, the remote storage manager 110 can determine whether the one container that satisfies the total number of storage disks criteria also satisfies the application profile. If the operations are coming from block 404, the remote storage manager 110 can determine whether the one container that has enough free capacity satisfies the application profile. As described above, there can be different types of application profiles having different criteria. If the container satisfies the application profile, operations of the flowchart 400 continue at block 412. Otherwise, operations of the flowchart 400 continue at transition point B, which continues at transition point B in the flowchart 300, in which a new container is created (as described above at block 310).

At block 412, the one container is selected. With reference to FIG. 1, the remote storage manager 110 can make this selection. For this path in the flowchart 400, the operations are complete.

Example Remote Storage Server

FIG. 5 depicts an example architecture of a remote storage server with a remote storage manager. A remote storage server 500 includes a processor 501 (possibly including multiple processors, multiple cores, multiple nodes, and/or implementing multi-threading, etc.). The remote storage server 500 includes a memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The remote storage server 500 also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, Fiber Channel interface, iSCSI, etc.), and storage disks 509 (e.g., optical storage, magnetic storage, etc.). The remote storage server 500 also includes a storage operating system 550, a remote storage manager 510, and a storage disk service 512 that provide just-in-time remote storage allocation, as described herein. Some or all of the operations of the storage operating system 550, the remote storage manager 510, and the storage disk service 512 may be implemented with code embodied in the memory and/or processor, co-processors, other cards, etc. Any one of these operations may be partially (or entirely) implemented in hardware and/or on the processor 501. For example, the operations may be implemented with an application specific integrated circuit, in logic implemented in the processor 501, in a co-processor on a peripheral device or card, etc.

Further, realizations may include fewer or additional components not illustrated in FIG. 5 (e.g., video cards, audio cards, additional network interfaces, peripheral devices, etc.). The processor 501, the storage disks 509, the network interface 505, the memory 507, the storage operating system 550, the remote storage manager 510, and the storage disk service 512 are coupled to the bus 503. Although illustrated as being coupled to the bus 503, the memory 507 may be coupled to the processor 501.

As will be appreciated by one skilled in the art, embodiments may be embodied as a system, method or program code/instructions stored in one or more machine-readable media. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Embodiments are described with reference to flowchart illustrations and/or block diagrams of methods, apparatus (systems) and program code according to aspects of the disclosure. It will be understood that each block of the flowchart illustrations and/or block diagrams, and combinations of blocks in the flowchart illustrations and/or block diagrams, can be implemented by program instructions. These program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These program instructions may also be stored in a machine readable medium that can direct a computer, other programmable data processing apparatus, or other devices to function in a particular manner, such that the instructions stored in the machine readable medium produce an article of manufacture including instructions which implement the function/act specified in the flowchart and/or block diagram block or blocks.

The program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for just-in-time storage allocation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   initiating a just-in-time storage allocation for storage at a remote storage device having flash storage, wherein each of multiple containers comprises a grouping of one or more of the flash storage, wherein the just-in-time storage allocation includes an application profile that includes a priority criteria for the storage of either a priority of performance over efficiency or a priority of efficiency over performance;
   determining whether at least one container of the multiple containers satisfies the priority criteria based on at least one attribute of the at least one container;

allocating the storage in the at least one container, in response to the at least one container satisfying the priority criteria;
determining whether free space in the at least one container is below a free space ratio after including the storage as part of an allocated storage for the at least one container; and
adding at least one additional flash storage to the at least one container, in response to determining that the free space in the at least one container is below the free space ratio after including the storage as part of the allocated storage for the at least one container.

2. The method of claim 1, wherein the at least one attribute comprises a number of the one or more flash storage in the at least one container.

3. The method of claim 1, wherein the at least one attribute comprises a size of the one or more flash storage in the at least one container.

4. The method of claim 1, further comprising:
adding another flash storage to the at least one container, in response to determining that the at least one container needs the another flash storage to allocate the storage in the at least one container.

5. The method of claim 1, further comprising:
determining whether an over provisioning rate of the at least one container is below an over provisioning ratio after including the storage as part of an allocated storage for the at least one container; and
adding another flash storage to the at least one container, in response to determining that the over provisioning rate of the at least one container is below the over provisioning ratio after including the storage as part of the allocated storage for the at least one container.

6. The method of claim 1, wherein the initiating is in response to a request from an application for the storage.

7. The method of claim 1, wherein the one or more flash storage in the at least one container have a same storage type.

8. The method of claim 1, wherein more than one container of the multiple containers satisfy the priority criteria in the application profile based on the at least one attribute of the at least one container, wherein the method comprises:
allocating the storage in a container of the more than one container that has a least number of flash storage.

9. A non-transitory machine readable medium having stored thereon instructions comprising machine executable code which when executed by at least one machine, causes the at least one machine to:
initiate a just-in-time storage allocation for storage at a remote storage device having flash storage, wherein each of multiple containers comprises a grouping of one or more of the flash storage, wherein the just-in-time storage allocation includes an application profile that includes a priority criteria for the storage of either a priority of performance over efficiency or a priority of efficiency over performance;
determine whether at least one container of the multiple containers satisfies the priority criteria based on at least one attribute of the at least one container, wherein the at least one attribute comprises a number of the one or more flash storage in the at least one container;
allocate the storage in the at least one container, in response to satisfaction by the at least one container of the priority criteria in the application profile;
determine whether an over provisioning rate of the at least one container is below an over provisioning ratio after including the storage as part of an allocated storage for the at least one container; and
add at least one additional flash storage to the at least one container, in response to a determination that the over provisioning rate of the at least one container is below the over provisioning ratio after inclusion of the storage as part of the allocated storage for the at least one container.

10. The non-transitory machine readable medium of claim 9, wherein the at least one attribute comprises a size of the one or more flash storage in the at least one container.

11. The non-transitory machine readable medium of claim 9, wherein the at least one attribute comprises a size of the one or more flash storage in the at least one container.

12. The non-transitory machine readable medium of claim 9, wherein the machine executable code which when executed by the at least one machine, causes the at least one machine to:
add another flash storage to the at least one container, in response to determining that the at least one container needs the another flash storage to allocate the storage in the at least one container.

13. The non-transitory machine readable medium of claim 9, wherein the machine executable code which when executed by the at least one machine, causes the at least one machine to:
determine whether free space in the at least one container is below a free space ratio after including the storage as part of an allocated storage for the at least one container; and
add another flash storage to the at least one container, in response to a determination that the free space in the at least one container is below the free space ratio after inclusion of the storage as part of the allocated storage for the at least one container.

14. The non-transitory machine readable medium of claim 9, wherein more than one container of the multiple containers satisfy the priority criteria in the application profile based on the at least one attribute of the at least one container, wherein the machine executable code which when executed by the at least one machine, causes the at least one machine to:
allocate the storage in a container of the more than one container that has a least number of flash storage.

15. An apparatus comprising:
a processor; and
a computer readable storage medium having program instructions embodied therewith, the program instructions executable by the processor to cause the apparatus to,
initiate a just-in-time storage allocation for storage at a remote storage device having flash storage, wherein each of multiple containers comprises a grouping of one or more of the flash storage, wherein the just-in-time storage allocation includes an application profile that includes a priority criteria for the storage of either a priority of performance over efficiency or a priority of efficiency over performance;
determine whether at least one container of the multiple containers satisfies the priority criteria based on at least one attribute of the at least one container;
allocate the storage in the at least one container, in response to satisfaction by the at least one container of the priority criteria in the application profile;

determine whether free space in the at least one container is below a free space ratio after including the storage as part of an allocated storage for the at least one container; and add at least one additional flash storage to the at least one container, in response to a determination that the free space in the at least one container is below the free space ratio after inclusion of the storage as part of the allocated storage for the at least one container.

16. The apparatus of claim 15, wherein the at least one attribute comprises a number of the one or more flash storage in the at least one container.

17. The apparatus of claim 15, wherein the at least one attribute comprises a size of the one or more flash storage in the at least one container.

18. The apparatus of claim 15, wherein the program instructions executable by the processor are to cause the apparatus to:

determine whether an over provisioning rate of the at least one container is below an over provisioning ratio after including the storage as part of an allocated storage for the at least one container; and add another flash storage to the at least one container, in response to a determination that the over provisioning rate of the at least one container is below the over provisioning ratio after inclusion of the storage as part of the allocated storage for the at least one container.

19. The apparatus of claim 15, wherein the one or more flash storage in the at least one container have a same storage type.

20. The apparatus of claim 15, wherein more than one container of the multiple containers satisfy the priority criteria in the application profile based on at least one attribute of the at least one container, wherein the program instructions executable by the processor are to cause the apparatus to:

allocate the storage in a container of the more than one container that has a least number of flash storage.

\* \* \* \* \*